(12) United States Patent
Kim

(10) Patent No.: US 6,796,296 B2
(45) Date of Patent: Sep. 28, 2004

(54) FLUID SWIRLING DEVICE FOR AN INTERNAL COMBUSTION ENGINE

(76) Inventor: Jay S. Kim, 9728 Alburtis Ave., Santa Fe Springs, CA (US) 90670

( * ) Notice: Subject to any disclaimer, the term of this patent is extended or adjusted under 35 U.S.C. 154(b) by 0 days.

(21) Appl. No.: 10/314,238

(22) Filed: Dec. 9, 2002

(65) Prior Publication Data
US 2003/0226539 A1 Dec. 11, 2003

Related U.S. Application Data

(63) Continuation-in-part of application No. 29/161,743, filed on Jun. 5, 2002, now Pat. No. Des. 469,781.

(51) Int. Cl.$^7$ ............................................... F02M 29/00
(52) U.S. Cl. ................... 123/590; 123/592; 123/184.21
(58) Field of Search ................................ 123/306, 590, 123/592, 593, 184.31, 184.32, 184.45, 184.54

(56) References Cited

U.S. PATENT DOCUMENTS

| | | | | |
|---|---|---|---|---|
| 4,428,336 A | * | 1/1984 | Dye et al. ................ | 123/188.7 |
| 4,463,742 A | * | 8/1984 | Williams .................... | 123/590 |
| 4,474,163 A | * | 10/1984 | Linder et al. ............... | 123/590 |
| 4,515,138 A | * | 5/1985 | Agadi ........................ | 123/590 |
| 4,729,776 A | | 3/1988 | Elliff | |
| 4,962,642 A | | 10/1990 | Kim | |
| 5,113,838 A | * | 5/1992 | Kim ............................ | 123/592 |
| 5,595,157 A | * | 1/1997 | Siew et al. ................. | 123/306 |
| 5,947,081 A | * | 9/1999 | Kim ............................ | 123/306 |
| 6,158,412 A | | 12/2000 | Kim | |
| 6,257,212 B1 | * | 7/2001 | Hammond .................. | 123/557 |
| 6,536,420 B1 | * | 3/2003 | Cheng ........................ | 123/590 |

* cited by examiner

Primary Examiner—John T. Kwon
(74) Attorney, Agent, or Firm—Chris Papageorge

(57) ABSTRACT

The device is utilized to provide swirling of either intake air flow or exhaust gas flow of an internal combustion engine. When used to swirl intake fluid flow, the device is positioned in the intake passageway for air entering the carburetor or fuel injection subsystem. The swirling of the air provides more complete mixing of the air and fuel entering the combustion chamber of the engine thereby providing more complete combustion of the fuel mixture. When utilized to swirl exhaust fluid flow, the device is positioned in the exhaust passageway for exhaust gases exiting the exhaust manifold. The swirling of the exhaust gases minimizes slowing of exhaust gas flow through the exhaust system to reduce back pressure and thereby provide more complete combustion. The device includes a set of flat planar vanes which are mounted within a housing. The varies are angled to impart a swirling motion to the intake air or exhaust gas passing through the housing. The vanes are also provided with curved trailing edges to minimize impediment to fluid flow passing through the housing and provided with angled trailing end portions to enhance effectiveness of the vanes in imparting a swirling motion to the fluid flow.

39 Claims, 5 Drawing Sheets

FLUID SWIRLING DEVICE FOR AN INTERNAL COMBUSTION ENGINE

This application is a continuation-in-part of patent application Ser. No. 29/161,743 filed Jun. 5, 2002 of applicant herein and now U.S. Pat. No. D 469,781.

BACKGROUND OF THE INVENTION

The invention relates generally to intake and exhaust systems for internal combustion engines. More specifically, the invention relates to such intake systems which provide enhanced combustion efficiency by providing more complete mixing of the air and fuel in the fluid flowing through the intake passageway. The invention also more specifically relates to such exhaust systems which provide enhanced combustion efficiency by improving exhaust gas flow through the exhaust system.

In a conventional internal combustion engine's intake system, the fluid flow which moves adjacent the walls of the intake passageway i.e., laminar fluid flow, typically includes a substantial amount of gasoline particles which are not atomized. Fuel that is not atomized does not readily combust. Thus, incomplete atomization of the fuel in the fluid flow hinders complete combustion of the fluid. This laminar flow consequently reduces the combustion efficiency of the engine. In addition, due to the frictional forces generated by contact of the fluid flow against the walls of the intake passageway and the difference in mass density between the gasoline molecules and air molecules the laminar fluid flow travels through the passageway at a slower velocity than the rest of the fluid flow. This difference in velocity additionally tends to hamper mixing of the gasoline particles with the air particles thereby further contributing to incomplete combustion of the fluid and reducing the efficiency of the engine.

Turbulence of the fluid flow passing through the intake passageway reduces laminar fluid flow and provides improved mixing of the air and fuel. Such benefits can be realized if turbulence is produced either in the air entering the carburetor (or fuel injection system), in the fluid passing through the intake manifold or intake runners or in the fluid passing through the intake ports or around the intake valves of the engine. Consequently, various devices and systems have been designed to produce such turbulence at various locations in the intake system.

Some prior art devices which are designed to produce turbulence in the air entering the fuel introduction subsystem include vanes which deflect the air passing thereagainst in order to impart a swirling motion to the air. Some such devices include a hub or central member to which the device vanes are attached. The central member provides rigidity to the vanes so that they do not absorb energy of deflection but rather transmit that energy back to the fluid. The central mender is typically streamlined in order to reduce obstruction of fluid flow and reduce negative pressure areas which would otherwise create undesired turbulence.

One of the primary disadvantages of prior art devices or systems that generate intake air turbulence is that they restrict air flow through the system. This undesirably reduces the maximum quantity of air and fuel that is delivered into the engine thereby reducing its maximum horsepower output. An example of a prior art device that generates swirling and also turbulence of the intake air is disclosed in U.S. Pat. No. 5,947,081 to Kim. The device disclosed includes vanes which have slits as well as concave and convex portions. The small concave and convex surface portions of the vanes deflect small portions of the air flow at relatively sharp angles of deflection. This high degree of deflection produces turbulence of the air stream. This turbulence includes collision of fluid flow molecules rather than a smooth blending or mixing of the fluid flow. Consequently, the collisions absorb energy thereby reducing the velocity of the fluid flow and consequently reducing fluid flow.

Another important disadvantage of some prior art devices is that they are difficult or expensive to mount in the engine system, some prior art devices such as that disclosed in U.S. Pat. No. 4,424,777 to Klomp require that they be installed around the intake valves necessitating that the purchaser disassemble the engine and have engine components suitably machined to adapt these components to the device. But, this is typically a time consuming and expensive endeavor rendering such devices impractical for many motor vehicle owners. Similarly, other prior art devices require that they be installed in the intake manifold or runner necessitating that the purchaser disassemble major components of the engine in order to install such devices. But, this is a time consuming endeavor also requiring a degree of mechanical skill rendering such devices impractical for many motor vehicle owners.

Designers of such prior art intake fluid turbulence generation systems have recognized that the effectiveness of such turbulence varies according to the engine throttle position. U.S. Pat. No. 4,424,598 to Tsutsumi discloses an automobile swirl producing system which is responsive to engine load and engine operating conditions. Basically, the Tsutsumi system uses a pivot shaft responsive to carburetor throttle valve position to alter the swirl produced in the combustion chamber. However, the disadvantage of such a system is that it is difficult to properly install.

Designers of exhaust systems have also recognized that improving the effectiveness of exhaust gas flow out of the engine can provide improved combustion efficiency. There have consequently been many exhaust systems that have sought to increase the velocity of exhaust gas flow out of the exhaust system and thereby scavenge exhaust gases from the combustion chamber and exhaust ports. Some exhaust header systems have been designed to position exhaust pipes around the inner circumference of a collector pipe to produce swirling of the exhaust gases from the collector pipe in a vortex flow and thereby enhance exhaust gas flow therefrom. Such systems have been very effective in improving exhaust as well as intake fluid flow and thereby improving combustion. However, such systems require retuning of the engine and replacement of major engine system components and are thus impractical for many motor vehicle owners.

The many requirements for such air swirling or air turbulence generating devices and systems have resulted in prior art systems and devices in which there are compromises between swirl or turbulence generating effectiveness and air flow restriction. In addition, there have also been many prior art systems that have been very effective in generating the required swirl or turbulence yet have necessitated undue engine component alterations and labor consumption. Consequently, what is needed is an intake and exhaust fluid swirling device which does not require special tools for installation and thus may be easily manually installed. What is also needed is an intake and exhaust fluid swirling device providing enhanced swirl generation while producing minimal fluid flow restriction.

SUMMARY OF THE INVENTION

It is a principal object of the present invention to provide an air swirling device that can be positioned in the intake passageway for air entering the fuel introduction subsystem of an internal combustion engine.

It is another object of the present invention to provide an intake and exhaust fluid swirling device having structural components that are angled and shaped to provide enhanced swirling of the fluid flow.

It is another object of the present invention to provide an intake and exhaust fluid swirling device having minimal structural components to provide minimal restriction of fluid flow therethrough.

It is also an object of the present invention to provide an intake and exhaust fluid swirling device having structural components that are shaped to provide minimal restriction of fluid flow therethrough.

It is also an object of the present invention to provide an air swirling device that does not require disassembly of major engine components for installation thereof.

It is an object of the present invention to provide an air swirling device that may be manually installed in an intake air passageway of an internal combustion engine.

It is an object of the present invention to provide an air swirling device that is structurally resilient to provide a snug fit in an intake air passageway of an internal combustion engine.

It is an object of the present invention to provide an exhaust gas swirling device that reduces back pressure.

Essentially, the device of the present invention is designed to be positioned in the fluid flow path of an internal combustion engine and deflect the flow passing therethrough so as to impart a rotational or swirling type of movement to the fluid. This swirling movement tends to move the fluid away from the walls of the passageway and reduce continual contact with the walls of the passageway which produce frictional forces exerting a drag on the fluid flow. When positioned in an intake passageways the swirl provides enhanced mixing of the air and fuel yielding more complete combustion of the fuel mixture. When positioned in a tailpipe or exhaust pipe, the swirl reduces the decrease in exhaust gas velocity that would otherwise occur yielding reduced backpressure and thereby increasing engine power output.

The device achieves its goal of swirling the fluid flow by incorporating vanes which are positioned in the fluid flow stream. The vanes are angled so that they deflect the fluid laterally into a rotational movement.

The device includes a housing within which the vanes are mounted. The housing is open at both longitudinal ends for the fluid flow to pass through. The housing is sized and shaped to accommodate the intake ducts or passageways of various motor vehicles as well as the exhaust pipes of various motor vehicles. This makes it relatively easy for a user to singly manually insert the device into an intake duct or exhaust pipe where it snugly fits therein and stays in place without the need for attachment means to anchor it in place.

The vanes are specially curved (at their edges) and shaped for maximal efficiency in producing the swirl effect with minimal fluid flow restriction. The vanes are longitudinally longer at the inner periphery of the housing than at the central area of the housing. Thus, the peripheral portions of the vanes are larger and therefore provide more deflection than the smaller more central portions of the vanes. This is desirable because it more efficiently yields the desired swirl. This is because the swirl produced is essentially air rotation about a central axis with the more peripheral air at peripheral areas of the passageway rotating more than the air at more centrally located areas. Consequently, flow deflection at the peripheral portions of the housing is much more effective in producing the desired fluid rotation about the central axis of the housing. Similarly, near the central area of the housing the vane portions are smaller producing less deflection and concomitantly less fluid flow restriction at the housing area where swirl can less effectively be produced.

The lower or trailing edges of the vanes are also curved to streamline the vanes for reduced fluid flow resistance. The curvature is in a direction of from the periphery to the center of the housing. Since the peripheral ends of the primary vanes are longer than the central (or inner) ends, the lower or trailing edge is angled in the direction of fluid flow and the curvature thereof is also curved in this direction.

In addition, the lower end portions and lower medial end portions of the vanes are bent in the direction of the deflection of the fluid flow. The lower end portions and lower medial end portions are thus angled laterally to enhance deflection of the fluid flow. This deflection provided by these lower portions is also very effective because the fluid flow has been previously deflected by upper portions of the primary vanes and has been moving downwardly alongside the vanes until it reaches these lower portions where it is further deflected to add more lateral movement and thereby more rotational movement to the fluid flow.

The device also includes secondary vanes for maximal efficiency in producing the swirl effect with minimal fluid flow restriction. The secondary vanes are mounted in the housing and attached to the walls thereof. The secondary vanes are also angled the same as the primary vanes for producing the desired deflection of the fluid flow. But, the secondary vanes are shorter in width and thus extend only a short distance toward the center and into the inner area of the housing so that they are located only in the inner peripheral area of the housing where there is maximal effectiveness in producing the fluid flow rotational movement.

Although prior art swirl devices utilize a central member or hub to which the vanes are attached, the present invention obviates the need for such a central member by interconnecting lateral inner ends of the vanes at the central area of the device. The central area of the housing is thus open and there is thus nothing to impede fluid flow through the center of the device. Thus, the present invention provides improved airflow over prior art comparable devices. Moreover, elimination of a central member does not result in reduction in the efficiency of the device in producing air swirl because the swirl produced is essentially air rotation about a central axis i.e., the center of the housing, with the more peripheral air at peripheral areas of the passageway rotating more than the air at more centrally located areas. The overall fluid movement is thus in the shape of a spiral as it moves through the passageway. Consequently, the swirl cannot typically be effectively accomplished by means of structures located at the center of the device but can instead be effectively accomplished by means of structures located at more peripheral portions of the device. Indeed, maximal twisting or turning of the fluid flow is accomplished by means of structures such as the secondary vanes and structure portions such as the larger peripheral portions of the primary vanes both of which are located at the area of the inner perimeter of the device.

Figure 4:
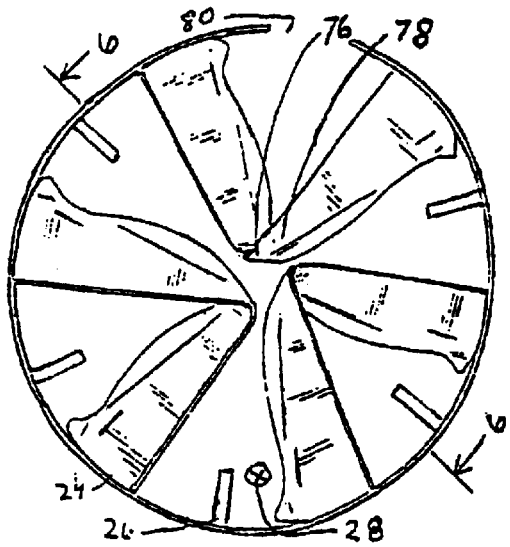
FIG. 4 is a top view of the device of the present invention.
Figure 5:
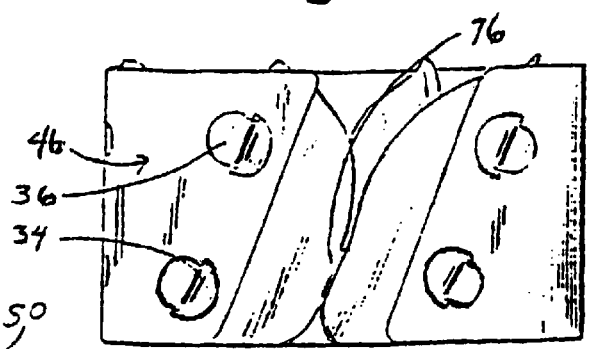
FIG. 5 is a side view of the device of the present invention showing the open lateral portion of the housing component of the invention.
Figure 6:
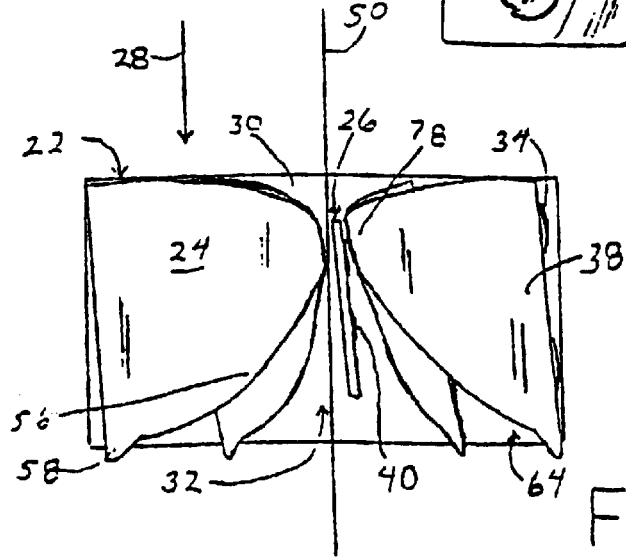

FIG, 6 is a longitudinal-sectional view of the device of the present invention taken along lines 6—6 of FIG. 4.

Figure 7:
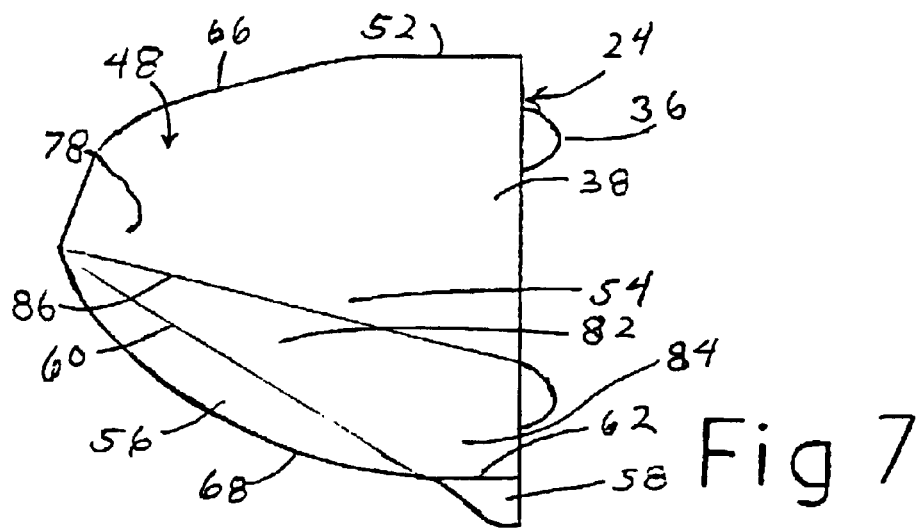

FIG. 7 is a side plan view of a representative vane of the device of the present invention.

Figure 8:
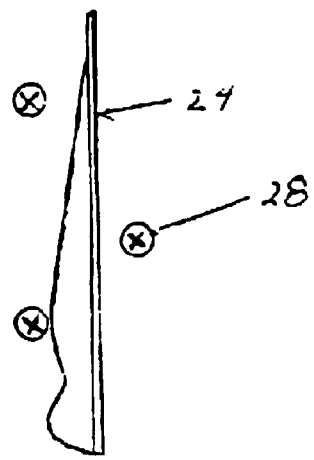

FIG. 8 is a top view of a representative vane of the device of the present invention.

Figure 9:
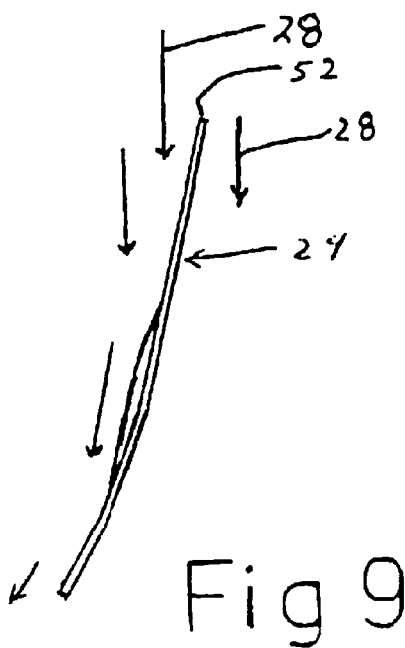

FIG. 9 is a rear end view of a representative vane of the device of the present invention showing the angled lower end portion thereof and also showing the fluid flow passing thereagainst and proximal thereto.

Figure 10:
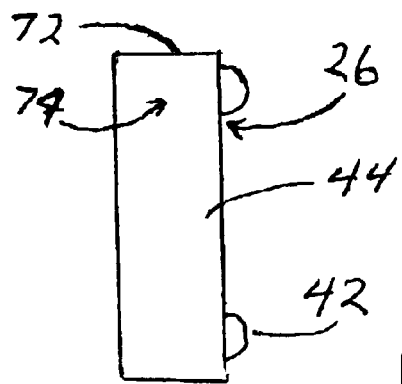

FIG. 10 is a side plan view of a representative secondary vane of the device of the present invention.

Figure 11:
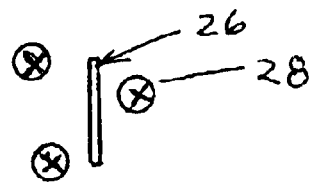

FIG. 11 is a top view of a representative secondary vane of the device of the present invention.

Figure 12:
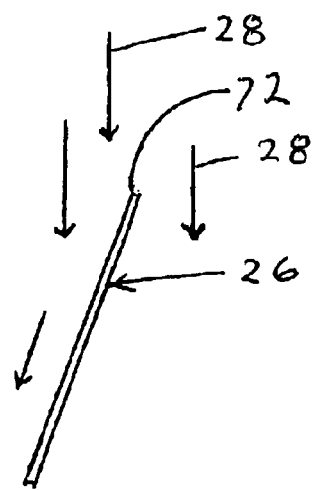

FIG. 12 is a rear end view of a representative secondary vane of the device of the present invention also showing the fluid flow passing thereagainst and proximal thereto.

DETAILED DESCRIPTION OF THE PREFERRED EMBODIMENT

Referring to the drawings, the swirling device of the present invention is generally designated by the numeral 10. The device 10 is sized to fit inside an intake passageway or duct 12 of the intake subsystem 14 of an internal combustion engine (not shown). The passageway 12 leads to a fuel introduction subsystem 16 which may be a fuel injection subsystem, as shown, or a carburetor. The passageway is thus used for delivery of intake air to the fuel injection subsystem 16 from the air filter box 88.

Figure 1:
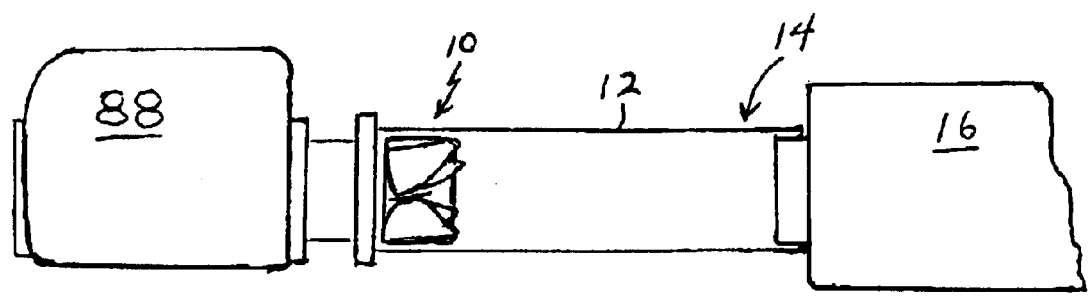
FIG. 1 is a sectional view of an intake air flow subsystem which incorporates the device of the present invention and showing the carburetor and intake duct of the subsystem.
Figure 2A:
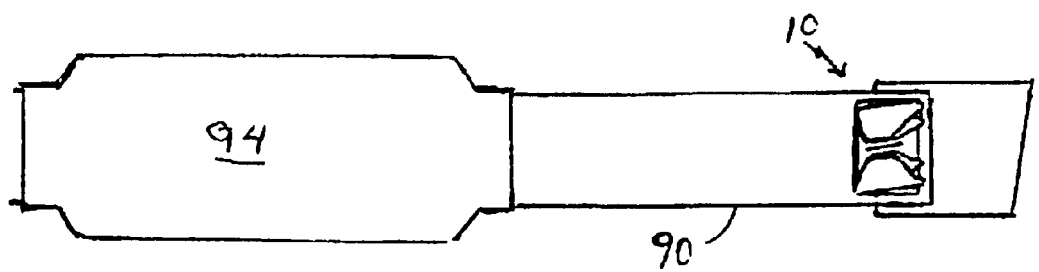
FIG. 2A is a sectional view of an exhaust gas flow subsystem which incorporates the device of the present invention and showing the catalytic converter and tailpipe of the subsystem.

FIG. 2A shows the device 10 mounted in an exhaust passageway or pipe 90. The tailpipe 90 is attached to a catalytic converter which receives the exhaust gases from the muffler (not shown) and from the engine (not shown). The device provides a swirl to the exhaust gases resulting in a vortex shaped flow stream thereby drawing out the exhaust gases from the exhaust system.

Figure 2B:
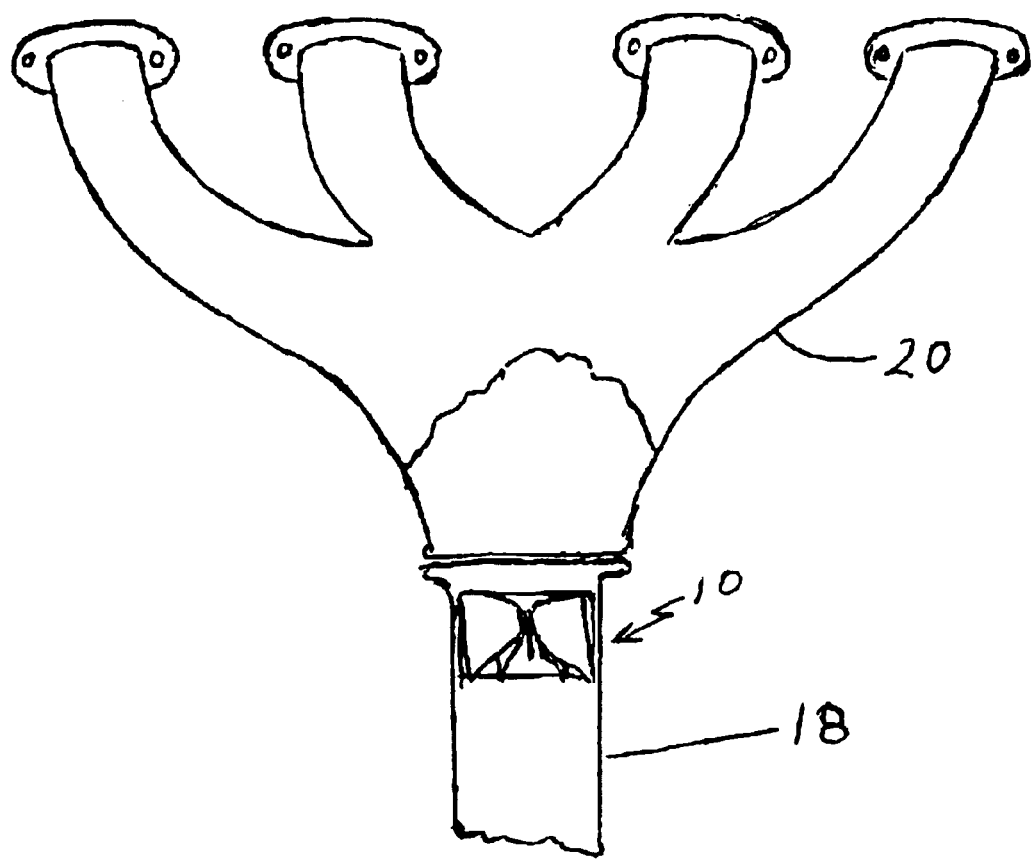
FIG. 2B is a sectional view of an exhaust gas flow subsystem which incorporates the device of the present invention and showing the exhaust manifold and exhaust pipe of the subsystem.
Figure 3:
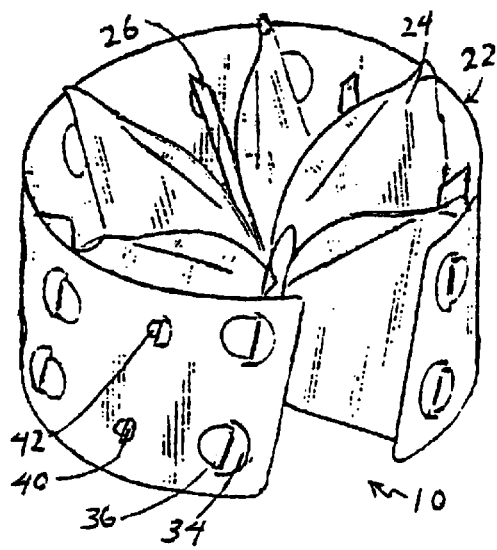
FIG. 3 is a perspective view of the device of the present invention.

FIG. 2B shows the device 10 mounted in another type of exhaust passageway or pipe 18. The exhaust pipe 18 is attached to an exhaust manifold 20 which receives the exhaust gases from the exhaust port (not shown) and combustion chamber (not shown) of the engine.

The device 10 is preferably manufactured in different sizes to accommodate the differently sized intake ducts and passageways of various makes and models of motor vehicles. The device includes a housing 22 which is preferably cylindrical in shape to accommodate standard intake ducts which are similarly cylindrical in shape. However, other shapes of housing may also be used to accommodate intake ducts having other shapes.

The device 10 utilizes a set of primary vanes 24 and a set of secondary vanes 26 to accomplish the desired objective of swirling the intake or exhaust fluid flow 28 passing through the passageway 12, passageway 90 or passageway 18. The vanes 24 and 26 are preferably rigid and mounted in the housing 22. More specifically, the vanes 24 and 26 are mounted on the walls 30 of the housing 22 such that they project toward the central area 32 of the housing 22. The vanes 24 and 26 are preferably attached to the walls 30 by means of apertures 34 located therein and extending therethrough. The apertures 34 receive tabs 316 located at rear end portions 38 of the vanes 24. Similarly vanes 26 are preferably attached to the walls 30 by means of apertures 40 located therein and extending therethrough. The apertures 40 similarly receive tabs 42 located at rear end portions 44 of vanes 26. The tabs 36 and 42 are bent over and onto outer surfaces 46 of the housing 22 and tack welded thereto. However, other suitable means of attachment of the vanes 24 and 26 to the housing 22 may also be utilized, if desired. The vanes 24 and 26 are thus in the housing 22 and in the fluid flow 28 passing through the passageway 12 or 18.

As shown in FIGS. 9 and 12, vanes 24 have upper edges 52 and 66 that are in misalignment with lower edges 68 thereof and vanes 26 have upper edges 72 that re in misalignment with lower edges 92 thereof. This misalignment is with reference to the direction of fluid flow 28 (or longitudinally with reference to the housing 22).

The vanes 24 are preferably oriented at an angle so that the flat planar outer surfaces 46 thereof face the fluid flow 28. The vanes 26 are similarly oriented at an angle so that the flat planar outer surfaces 74 face the fluid flow 28. The fluid flow 28 striking the surface 48 and surface 74 thus is deflected laterally. The vanes 24 and 26 are preferably oriented at an angle of twenty-five degrees with reference to the axis 50 of the housing 22. More specifically, the angular orientation of the vanes 24 is with reference to a plane which includes the axis 50 and the upper edge 52 of the particular vane 24. Similarly, the angular orientation of the vanes 26 is with reference to a plane which includes the axis 50 and the upper edge 72 of the particular vane 26. Since the axis 50 preferably coincides with the direction of the fluid flow 28, the angular orientation is also relative to the direction of fluid flow 28 entering the housing 22. The vanes 24 and 26 are also oriented at an angle which is laterally clockwise from a vantage point of fluid flow 28 entering the housing 22. Thus, this particular orientation of the vanes 24 and 26 deflects the fluid flow 28 laterally thereby essentially turning and rotating it in a clockwise direction. This clockwise rotational movement of the fluid flow results in a spiral shaped movement of the fluid flow 98 that exits from the housing 22.

The primary vanes 24 have main portions 54, inner lower medial end portions 82, outer lower medial end portions 84, inner lower end portions 56 and outer lower end portions 58 which are all flat planar. The lower medial end portions 82 and 84 are bent along bend lines 86 and 88 respectively so that portions 82 and 84 are angled horizontally in a clockwise direction from the vantage point of the fluid flow entering the housing 22 with reference to the plane that includes the upper edge 52 and the axis 50 (or direction of fluid flow 28 into the housing). Thus, the lower end portions 82 and 84 are oriented in the same direction as main portions 54 of vanes 24. However, in addition to being angled twelve degrees with reference to the plane of the upper edge 52 and axis 50, these lower end portions are angled in the same direction as the main portions 54, as described in detail hereinabove. Similarly, the lower end portions 56 and 58 are bent along bend lines 60 and 62 respectively so that portions 56 and 58 are angled horizontally in a clockwise direction from the vantage point of the fluid flow entering the housing 22 with reference to the plane that includes the upper edge 52 and the axis 50 (or direction of fluid flow 28 into the housing). Thus, as with lower medial end portions 82 and 84, the lower end portions 56 and 58 are oriented in the same direction as main portions 54 of vanes 24. The lower end portions 56 and 58 are angled twenty-four degrees with reference to the plane of the upper edge 52 and axis 50 as well as angled in the same direction as the main portions 54. Thus, the fluid flow that has been deflected horizontally by the main portions 54 is further deflected horizontally by the lower medial end portions 82 and 84 and subsequently by the lower end portions 56 and 58. The fluid flow 28 which passes alongside the main portions 54 and thereby diverted from its previously solely longitudinal direction of movement into a horizontal direction acquires a certain degree of directional stability by the support provided by the angled main portions 54. This directional stability of the fluid flow stream can be relatively easily changed by deflection via the lower medial end portions 82 and 84 and the lower end portions 56 and 58 in the same horizontal direction thereby enhancing the rotational movement imparted to the fluid flow 28. The fluid flow 28 exiting the housing 22 thus swirls more due to the angled portions 82, 84, 56 and 58 than otherwise. Deflection of the fluid flow 28 successively in three steps is also more effective than simply angling the entire vane 24 at the same angular orientation as the lower end portions 56 and 58. The bend line 62 is preferably perpendicular to the directional line of fluid flow 28. The bend lines 60 are preferably angled at a forty-five degree angle in the direction of fluid flow 28 while the bend lines 86 are preferably angled at a sixty degree angle in the direction of fluid flow 28.

The vanes 24 are preferably interconnected at front or inner end portions 78 via interconnection members 76. Vanes 24 are thus formed into pairs of vanes 24. Interconnection members 76 are preferably laterally curved while longitudinally straight such that they are semi-cylindrical in shape. The members 76 are preferably oriented at an angle of twenty-five degrees relative to the plane including the upper edge 52 and the axis 50, as with the vanes 24 and 26. Since the interconnection members 76 interconnect the vanes 24 providing structural rigidity thereto, there is no need for a support structure at the center of the housing 22 to attach the vanes 24 to and thereby provide support thereto. Consequently, the center of the housing 22 is open allowing fluid to freely pass therethrough. Since the center of the housing cannot pragmatically incorporate structures that can effectively provide swirl to the fluid flow, the lack of central structures does not reduce the swirl provided by the device 10 but instead minimizes fluid flow restriction of the device 10.

The vanes 24 are preferably longitudinally longer at peripheral area of the housing than at the central area 32. Thus, the rear end portions 38 of the vanes 24 are longer than the front end portions 78. More specifically, the front end portions 78 are twenty-five percent of the length of the rear end portions 38. Basically, this difference in length reduces the longitudinal length of the vanes at the more central area where the vane 24 is less effective in producing swirl. In addition, front upper edges 66 of the vanes 24 are curved in the direction of fluid flow 28 and lower edges 68 of the vanes 24 also are curved also in the direction of fluid flow 28. Edges 66 and 68 are curved toward each other into a converging direction so that the vanes are substantially smaller at the central area 39 than at the peripheral area. The front and rear upper edges or leading edges 52 first meet the fluid flow 28 so the rear leading edge 52 is straight to provide larder vane 24 area at the peripheral area 64 where the vanes 24 can more effectively provide swirl while the front leading edge 66 is curved downwardly to provide smaller vane 24 surface area at the central area 32 where the vanes 24 cannot relatively provide swirl.

The device 10 is used in an intake duct 12 to provide swirl to the air flow exiting the device but may also be used in an intake manifold or runner to swirl the fluid flow which includes both air and fuel. However, when used in a tailpipe, exhaust pipe or other portion of the exhaust system, the device 10 also provides swirl of the fluid flow exiting the device but the ultimate purpose of this application is not to provide mixing of the components of the fluid but simply to improve exhaust gas flow. Basically, the device 10 functions to draw out exhaust gases from the exhaust system.

The housing 22 is preferably composed of stainless steel but other suitable inflexible or flexible materials may also be used. The vanes are also preferably composed of stainless steel but other suitable inflexible materials may also be used.

The housing 22 preferably includes lateral ends 70 which partly define an open area 80 at a lateral portion of the housing 22. Thus, the housing 22 is instead open at a lateral side thereof to provide a springiness or resilience to the housing 22. This springiness feature enables the housing to more snugly fit within the passageway with reduced likelihood that it will slip out of its desired position in the passageway.

Accordingly, there has been provided, in accordance with the invention, a device for swirling the fluid flow passing through the passageway of an intake or exhaust system of an internal combustion engine that fully satisfies the objectives set forth above. It is to be understood that all terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention set forth in the claims hereinbelow.

What is claimed is:

1. A device for swirling intake air of an internal combustion engine, comprising:
    a housing for positioning in an intake air passageway of the engine;
    a plurality of primary vanes disposed within said housing and secured at ends thereof to walls of said housing;
    a plurality of secondary vanes disposed within said housing and secured at ends thereof to the walls of said housing, said plurality of secondary vanes oriented to extend longitudinally relative to said housing entire length of said plurality of secondary vanes.

2. The device of claim 1 wherein said plurality of primary vanes and said plurality of secondary vanes are flat planar.

3. The device of claim 1 wherein said plurality of primary vanes include a set of pairs of primary vanes, each of said pairs interconnected at a central area of said housing so that said housing has a central area which is open for enhancing air flow through said housing.

4. The device of claim 1 wherein each of said plurality of vanes are oriented with bottom edge thereof positioned in misalignment with upper edge thereof with reference to direction of air flow entering said housing so that each of said plurality of vanes is at an angular orientation in order to impart a rotational movement to air flow passing thereagainst and thereby through said housing.

5. The device of claim 1 wherein said plurality of vanes include main portions and bottom end portions which are angled horizontally relative to said main portions and in a direction from a vantage point of air flow entering said housing.

6. The device of claim 1 wherein said housing is cylindrical and open at longitudinal ends thereof and at a lateral portion thereof, said lateral portion open entire longitudinal length thereof.

7. The device of claim 1 wherein each of said plurality of secondary vanes is angled relative to a plane which includes an upper edge of said each of said plurality of secondary veins and a directional line of air flow through said housing.

8. The device of claim 1 wherein each of said plurality of secondary veins are of substantially shorter width than said plurality of primary vanes and of substantially shorter length than said housing and wherein said plurality of secondary vanes are positioned between said plurality of primary vanes.

9. A device for swirling intake air of an internal combustion engine, comprising:
a housing for positioning in an intake air passageway of the engine;
a plurality of primary vanes disposed within said housing and secured at lateral ends thereof to walls of said housing, each of said primary vanes having a an outer lower end portion and an inner lower end portion, said inner lower end portion extending laterally inwardly a shorter distance at inner portion thereof relative to peripheral portion thereof so that said lower end portion is axially tapered, and said outer lower end portion extending laterally inwardly same distance at inner portion thereof relative to peripheral portion thereof so that said outer lower end portion is untapered.

10. The device of claim 9 wherein said plurality of primary vanes include a set of pairs of primary vanes, each of said pairs interconnected at a central area of said housing so that said housing has a central area which is open for enhancing airflow through said housing.

11. The device of claim 9, wherein said housing is cylindrical and is open at longitudinal ends thereof and at a lateral portion thereof, said lateral portion open entire longitudinal length thereof.

12. A device for swirling intake air of an internal combustion engine, comprising:
a housing for positioning in an intake air passageway of the engine;
a plurality of primary vanes disposed within said housing and secured at ends thereof to walls of said housing, said plurality of primary vanes including main portions and medial end portions which are angled relative to said main portions in a horizontal clockwise direction from a vantage point of air flow entering said housing.

13. The device of claim 12 wherein each of said plurality of primary vanes have a bend line for said medial end portions, said bend line at a forty-five degree angle relative to direction of air flow through said housing.

14. The device of claim 12 wherein said plurality of primary vanes include a set of pairs of primary vanes, each of said pairs interconnected at a central area of said housing so that said housing has a central area which is open for enhancing airflow through said housing.

15. The device of claim 14 further including interconnecting members for interconnecting said set of pairs of primary vanes at inner lateral end portions, said interconnecting members being laterally curved and longitudinally straight.

16. The device of claim 12 wherein each of said plurality of vanes have a lower end portion which is curved toward the center of the housing and in a direction of airflow through said housing.

17. The device of claim 12 wherein each of said plurality of vanes are oriented with bottom edge thereof positioned in misalignment with upper edge thereof with reference to direction of air flow entering said housing and in a direction of the misalignment which is clockwise from a vantage point of air flow entering said housing so that each of said vanes are at an angular orientation in order to impart a clockwise rotational movement to air flow passing thereagainat and thereby through said housing.

18. The device of claim 12 wherein said housing is cylindrical and is open at longitudinal ends thereof and at a lateral portion thereof, said lateral portion open entire longitudinal length thereof.

19. The device of claim 12 wherein said housing includes a first set of apertures and a second set of apertures and wherein said plurality of primary veins include a first set of tabs and wherein said plurality of secondary vanes include a second set of tabs, said first set of apertures receiving said first set of tabs and said second set of apertures receiving said second set of tabs for securement of said plurality of primary vanes and said plurality of secondary vanes to said housing.

20. A device for swirling exhaust fluid of an internal combustion engine, comprising:
a housing for positioning in an exhaust fluid passageway of the engine;
a plurality of primary vanes disposed within said housing and secured at lateral ends thereof to walls of said housing, each of said primary vanes, having a lower end portion which is curved toward the center of the housing and in the direction of the fluid flow and each of said primary vanes having an inner end portion and an outer end portion, said inner end portion longitudinally shorter than said outer end portion, said plurality of primary vanes including main portions and medial end portions which are angled relative to said main portions in a horizontal clockwise direction from a vantage point of fluid flow entering said housing;
a plurality of secondary vanes disposed within said housing and secured at ends thereof to the walls of said housing.

21. The device of claim 20 wherein said plurality of primary vanes are flat planar and include a set of pairs of primary vanes, each of said pairs interconnected at a central area of said housing so that said housing has a central area which is open for enhancing fluid flow through said housing.

22. The device of claim 21 further including a set of interconnecting members for interconnecting each of said set of pairs of primary vanes at inner lateral end portions, said set of interconnecting members being laterally curved and longitudinally straight.

23. The device of claim 20 wherein each of said plurality of vanes have a lower end portion which is curved toward the center of the housing and in the direction of the fluid flow through said housing.

24. The device of claim 20 wherein each of said plurality of primary and secondary vanes are oriented with bottom edge thereof positioned in misalignment with upper edge thereof with reference to direction of fluid flow entering said housing and in a direction of the misalignment which is clockwise from a vantage point of fluid flow entering said housing so that each of said plurality of primary and secondary vanes are at an angular orientation in order to impart a clockwise rotational movement to fluid flow passing thereagainst and thereby through said housing.

25. The device of claim 20 wherein said each of said plurality of primary and secondary vanes are oriented at a twenty-five degree longitudinal angle relative to the direction of the fluid flow through said housing.

26. The device of claim 20 wherein said plurality of primary vanes include main portions and medial end portions which are angled ten degrees horizontally relative to said main portions and in a clockwise direction from the vantage point of fluid flow entering said housing, said plurality of primary vanes having a bend line for said medial end portions, said bend line at a sixty degree angle with reference to direction of fluid flow through said housing.

27. The device of claim 20 wherein said housing is cylindrical and is open at longitudinal ends thereof and at a lateral portion thereof, said lateral portion open entire longitudinal length thereof.

28. The device of claim 20 wherein each of said secondary vanes is angled relative to a plane which includes an upper edge of said each of said secondary veins and a directional line of the fluid flow through said housing.

29. The device of claim 20 wherein said plurality of secondary veins are of substantially shorter width than said plurality of primary vanes and of substantially shorter length than said housing and wherein said plurality of secondary vanes are positioned between said plurality of primary vanes.

30. The device of claim 20 wherein said housing includes a first set of apertures and a second set of apertures and wherein said primary veins include a first set of tabs and wherein said secondary vanes include a second set of tabs, said first set of apertures receiving said first set of tabs and said second set of apertures receiving said second set of tabs for securement of said plurality of primary vanes and said plurality of secondary vanes to said housing.

31. A device for swirling intake air of an internal combustion engine, comprising:
a housing for positioning in an intake air passageway of the engine, said housing cylindrical and open at longitudinal ends thereof and at a lateral portion thereof, said lateral portion open entire longitudinal length thereof:
a set of pairs of primary vanes disposed within said housing and secured at ends thereof to walls of said housing, each of said set of pairs of primary vanes having a lower end portion which is curved radially and axially with reference to said housing, said set of pairs of primary vanes being flat planar and including main portions and medial end portions which are angled five degrees relative to said main portions in a horizontal direction and a clockwise direction from the vantage point of air flow entering said housing, said set of pairs of primary vanes having bend lines for said medial end portions which are angled sixty degrees with reference to a direction of air flow through said housing, each of said set of pairs of primary vanes oriented so that it is angled twenty-five degrees horizontally and in a clockwise direction from a vantage point of air flow entering said housing relative to a plane which includes an upper edge of said each of said set of pairs of primary vanes and a directional line of air flow through said housing with a bottom edge of said each of said set of pairs of primary vanes positioned away from the plane in a horizontal direction from the vantage point of air flow entering said housing;
a set of interconnecting members for interconnecting each of said set of pairs of primary vanes together at inner lateral end portions thereof and proximal a central area of said housing so that the central area is open for enhancing air flow through said housing, said set of interconnecting members being laterally curved and longitudinally straight;
a plurality of secondary vanes disposed within said housing and secured at ends thereof to the walls of said housing, said plurality of secondary vanes being flat planar and positioned between said primary vanes, each of said secondary vanes oriented so that it is angled horizontally and in a clockwise direction from the vantage point of air flow entering said housing relative to a plane which includes an upper edge of said each of said secondary vanes and the directional line of fluid flow through said housing with a bottom edge of said each of said secondary vanes positioned away from the plane in a horizontal direction from the vantage point of fluid flow entering said housing.

32. A device for swirling intake air of an internal combustion engine, comprising:
a housing for positioning in an intake air passageway of the engine;
a plurality of primary vanes disposed within said housing and secured at ends thereof to walls of said housing, said plurality of primary vanes including a set of pairs of primary vanes, each of said pairs interconnected at a central area of said housing so that said housing has a central area which is open for enhancing air flow through said housing,
a set of interconnecting members for interconnecting said set of pairs of primary vanes at inner lateral end portions at a central area of said housing so that said housing has a central area which is open for enhancing air flow through said housing, said set of interconnecting members being laterally curved and longitudinally straight;
a plurality of secondary vanes disposed within said housing and secured at ends thereof to the walls of said housing.

33. A device for swirling intake air of an internal combustion engine, comprising:
a housing for positioning in an intake air passageway of the engine;
a plurality of primary vanes disposed within said housing and secured at ends thereof to walls of said housing, each of said plurality of primary vanes having a lower end portion which is curved toward the center of the housing and in a direction of air flow through said housing;
a plurality of secondary vanes disposed within said housing and secured at ends thereof to the walls of said housing.

34. A device for swirling intake air of an internal combustion engine, comprising:
a housing for positioning in an intake air passageway of the engine;
a plurality of primary vanes disposed within said housing and secured at ends thereof to walls of said housing;
a plurality of secondary vanes disposed within said housing and secured at ends thereof to the walls of said housing, each of said plurality of vanes oriented with bottom edge thereof positioned in misalignment with upper edge thereof with reference to direction of air flow entering said housing so that each of said plurality of vanes is at an angular orientation in order to impart a rotational movement to air flow passing thereagainst and thereby through said housing.

35. A device for swirling intake air of an internal combustion engine, comprising:

a housing for positioning in an intake air passageway of the engine;

a plurality of primary vanes disposed within said housing and secured at lateral ends thereof to walls of said housing, each of said primary vanes having a lower end portion which is curved toward the center of the housing and in the direction of the airflow, and each of said primary vanes having an inner end portion and an outer end portion, said inner end portion longitudinally shorter than said outer end portion;

interconnecting members for interconnecting said set of pairs of primary vanes at inner lateral end portions, said interconnecting members being laterally curved and longitudinally straight.

36. A device for swirling intake air of an internal combustion engine, comprising:

a housing for positioning in an intake air passageway of the engine;

a plurality of primary vanes disposed within said housing and secured at lateral ends thereof to walls of said housing, each of said primary vanes having a lower end portion which is curved toward the center of the housing and in the direction of the airflow, and each of said primary vanes having an inner end portion and an outer end portion, said inner end portion longitudinally shorter than said outer end portion, and each of said primary vanes oriented with bottom edge thereof positioned in misalignment with upper edge thereof with reference to direction of air flow entering said housing so that each of said plurality of vanes are at an angular orientation in order to impart a rotational movement to air flow passing thereagainst and thereby through said housing.

37. A device for swirling intake air of an internal combustion engine, comprising:

a housing for positioning in an intake air passageway of the engine;

a plurality of primary vanes disposed within said housing and secured at lateral ends thereof to walls of said housing, each of said primary vanes having an outer lower end portion and an inner lower end portion which is longitudinally angled relative to said outer lower end portion.

38. A device for swirling intake air of an internal combustion engine, comprising:

a housing for positioning in an intake air passageway of the engine;

a plurality of primary vanes disposed within said housing and having medial portions which are flat planar and extend longitudinally a shorter distance at inner portions thereof relative to peripheral portions thereof so that said medial end portions are radially tapered.

39. A device for swirling intake air of an internal combustion engine, comprising:

a housing for positioning in an intake air passageway of the engine;

a plurality of primary vanes disposed within said housing and secured at lateral ends thereof to walls of said housing, each of said primary vanes being flat planar and having a main portion and having a lower end portion extending a longitudinally shorter distance at inner portions thereof relative to peripheral portions thereof so that said inner lower end portion is radially tapered.

* * * * *